Nov. 9, 1926.
1,606,718
H. N. ORUP
TOOL HOLDER
Filed Jan. 27, 1925
4 Sheets-Sheet 2
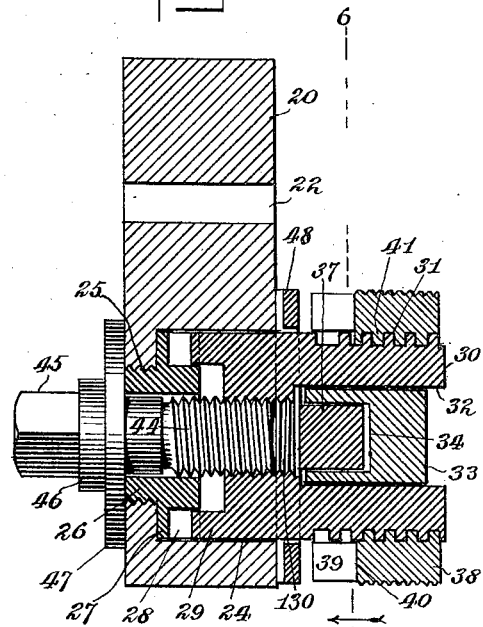
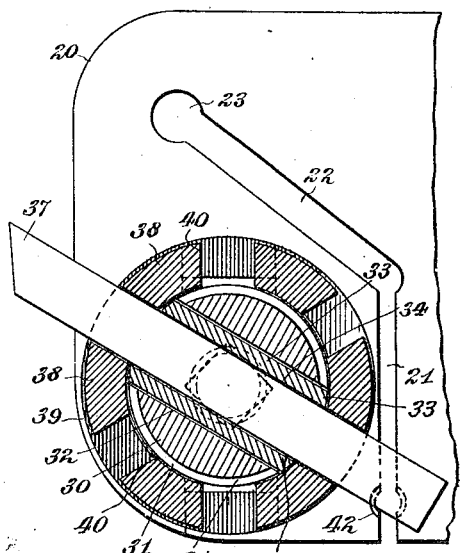
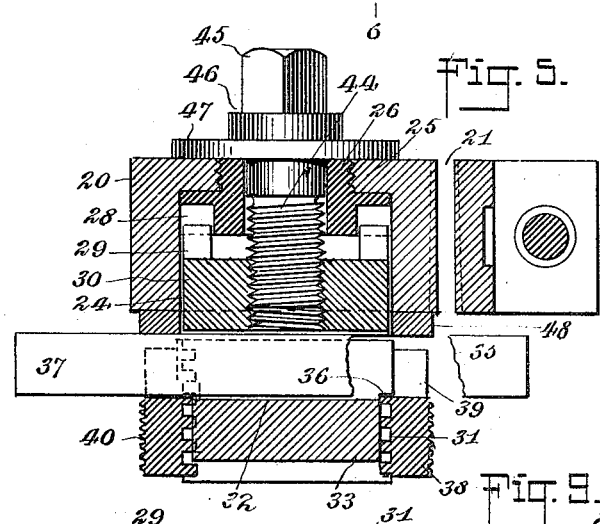
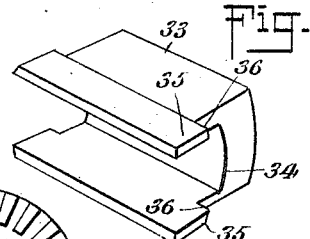
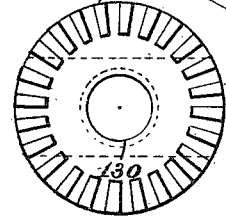
INVENTOR
H. N. Orup.
BY
ATTORNEYS Nov. 9, 1926.                                                      1,606,718
H. N. ORUP
TOOL HOLDER
Filed Jan. 27, 1925                  4 Sheets-Sheet 3

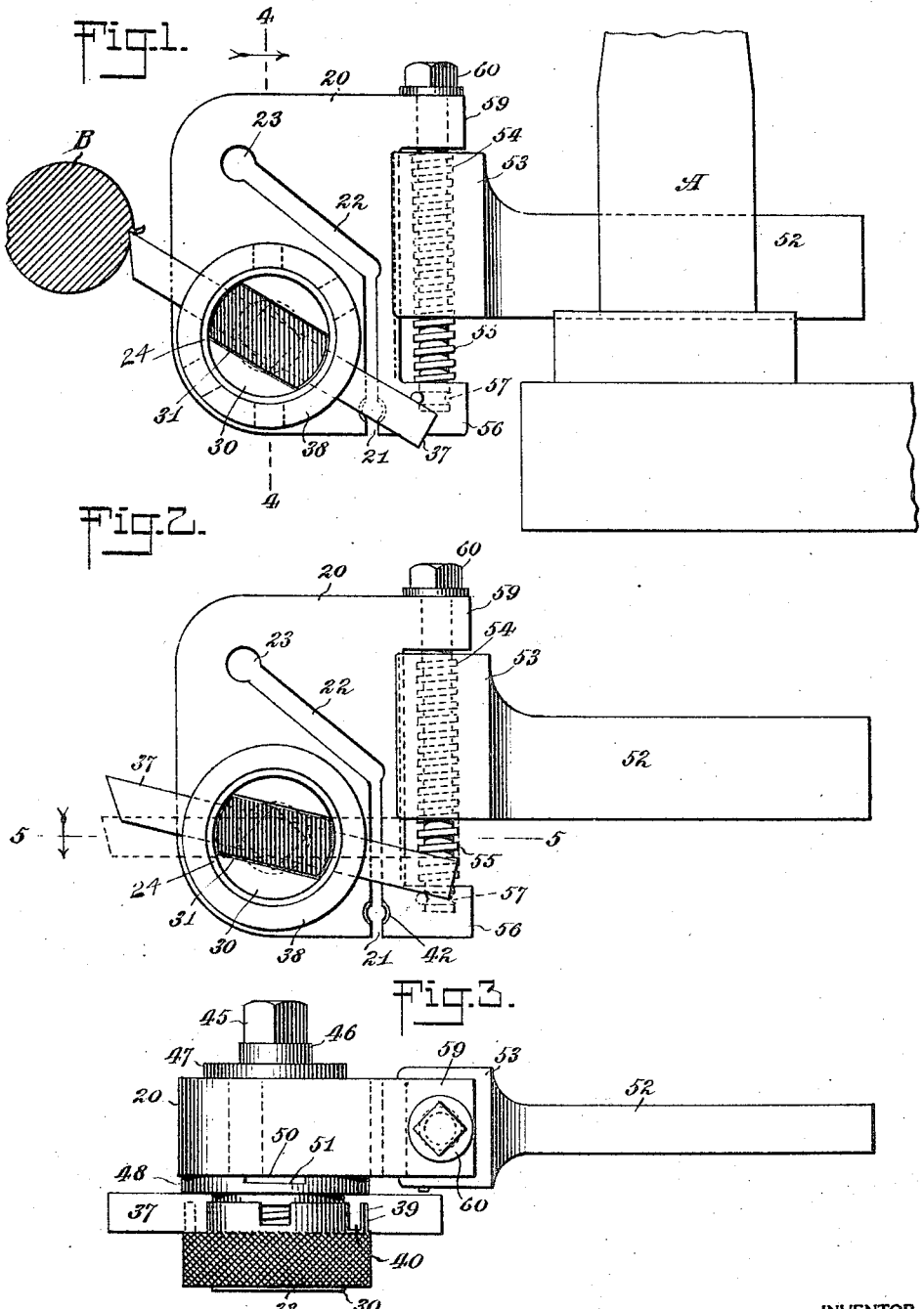

WITNESSES

INVENTOR
H. N. Orup.
BY
ATTORNEYS

Nov. 9, 1926.
H. N. ORUP
1,606,718
TOOL HOLDER
Filed Jan. 27, 1925    4 Sheets-Sheet 4
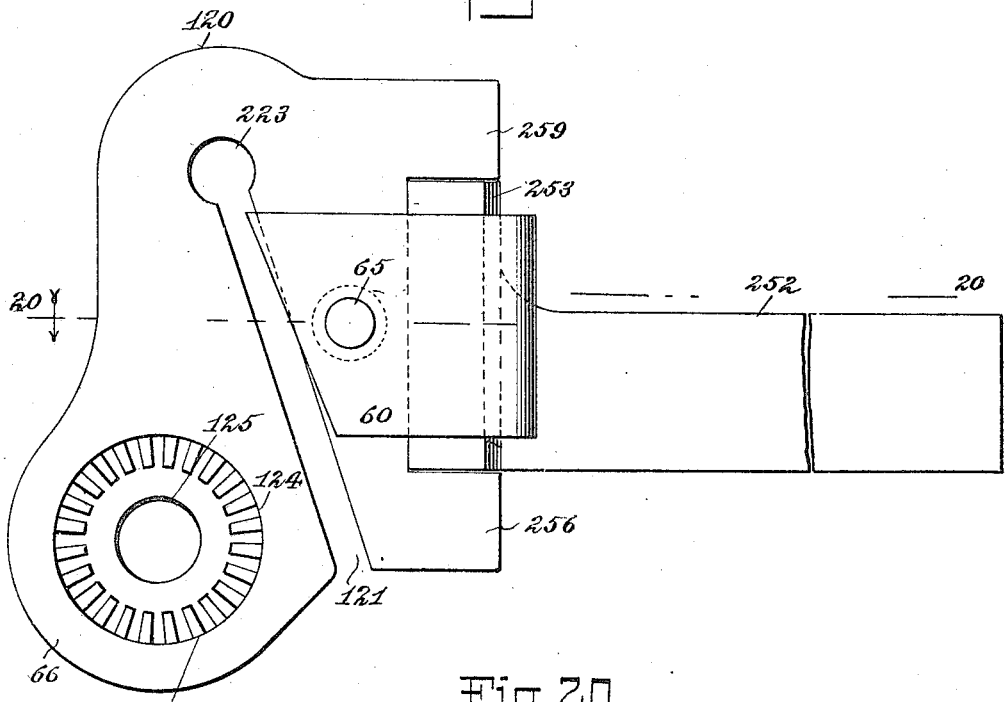
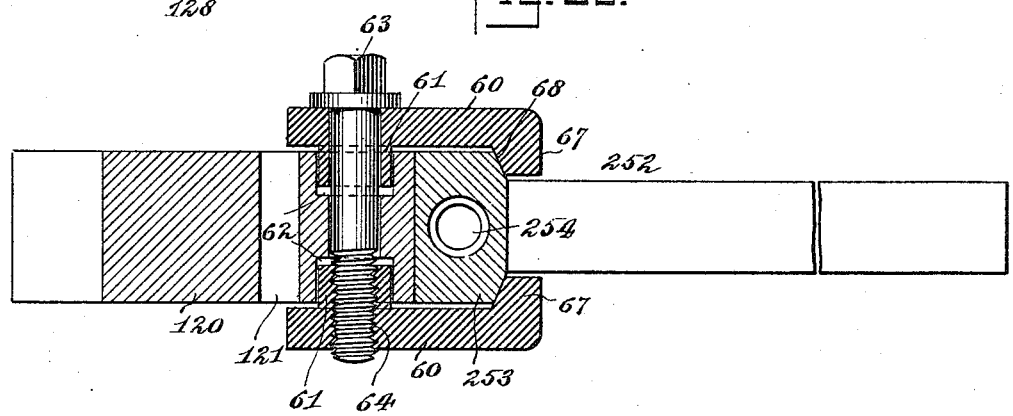
WITNESSES
INVENTOR
H. N. Orup
BY
ATTORNEYS Patented Nov. 9, 1926.

1,606,718

UNITED STATES PATENT OFFICE.

HJALMAR NATANAEL ORUP, OF ATTLEBORO, MASSACHUSETTS.

TOOL HOLDER.

Application filed January 27, 1925. Serial No. 5,134.

My invention relates to a tool holder for metal working tools. In metal working with the single point tool used on lathes and planers, it is recognized that it is a difficult matter to eliminate a series of wavelike depressions caused by the tendency of the tool to bite into the work, the result being what is technically known as "chatter". The chattering referred to is less frequent at slow speed and with sharp pointed tools but becomes very troublesome at high speeds and with wide surfaces of tool contact as in forming tools. In attempts to overcome the serious defect referred to, manufacturers of machine tools have increased the size of the journals or spindles of lathes and generally have strengthened the construction of their tools. The result was helpful but did not obliterate the tendency of the tool to chatter. In addition to the difficulty of removing the effects of chatter by means of filing or grinding, the effect of the chatter is very often the real cause of the heating and breaking of tools and with the use of high speed steels the tendency of heating and breakage is increased.

For many years it has been known to mechanics that chattering can be minimized or actually prevented by the use of a tool which provides a certain elasticity or spring which permits the cutting point to recede from the work while maintaining a steady pressure. Crude tools have been fashioned of gooseneck shape or approximately so and these demonstrated the correctness of the theory respecting resiliency tending to overcome chattering. The possibilities of tools and holders possessing the attribute of resiliency as referred to has not been realized and the development of such tools has not proceeded to a point resulting in real efficiency.

An important object of my invention is to provide a novel tool holder utilizing the feature of resiliency to the maximum extent and in a practical manner.

A further object of the invention is to provide novel means for holding the tool at the desired angle for the higher theoretical and practical efficency.

A further important object of my invention is to provide a tool holder in which the head or holder proper and its shank are relatively adjustable in a manner that the tool point may be adjusted at any desired point on a lathe without disturbing the angle of approach commonly termed the rake, as well as to provide an assemblage of tool-holding head and shank when desired, characterized by a rigid relation between the head and shank for use on planers where a vertical adjustment is not necessary.

My invention also has as an object to provide a tool holder well adapted for receiving and holding thin blades instead of bits for the purpose of cutting off stock.

The manner and means whereby the above and other objects are attained will clearly appear as the description proceeds.

Reference is to be had to the accompanying drawings forming a part of this specification, it being understood that the drawings are merely illustrative of two examples of the invention.

Figure 1 is an elevation of a tool holder embodying my invention showing the same supported in the tool post of the lathe, a piece of work being indicated in section;

Figure 2 is a side elevation of the tool holder but indicating different angular adjustments of the tool;

Figure 3 is a plan of the tool holder;

Figure 4 is a transverse vertical section in the plane indicated by the line 4—4, Figure 1;

Figure 5 is a horizontal section generally in the plane indicated by the line 5—5, Figure 2, the tool being shown in plan and partly broken away;

Figure 6 is a transverse vertical section on the line 6—6, Figure 4;

Figure 7 is a view of the inner end of the sleeve applied to the tool-holding stud;

Figure 8 is a side elevation of the tool-holding stud;

Figure 9 is a view of the stud at the clutch end thereof;

Figure 10 is a perspective view of one of the adjusting elements interchangeably employed with the stud to adapt the tool holder to tools of different sizes;

Figure 11:
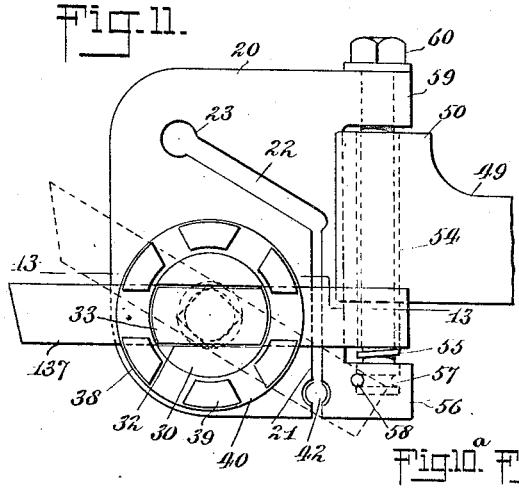
Figure 12:
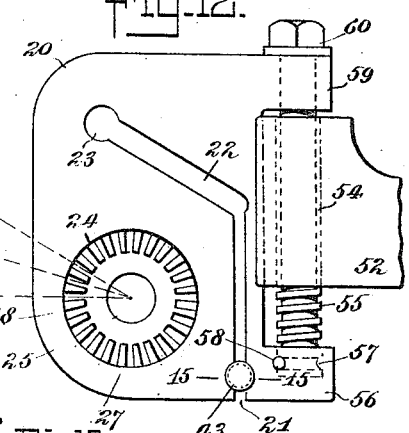
Figure 13:
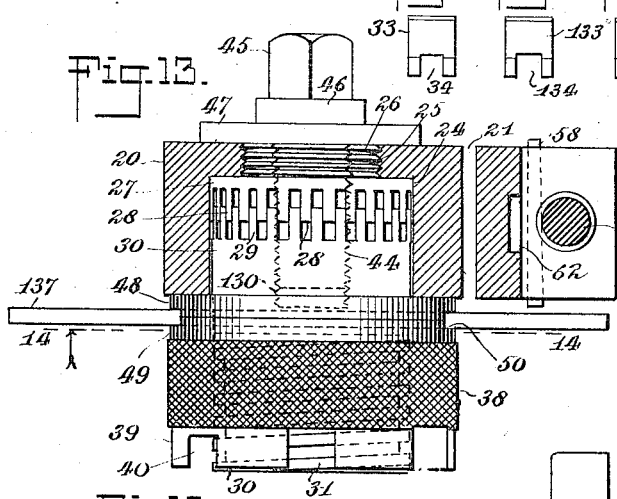
Figure 14:
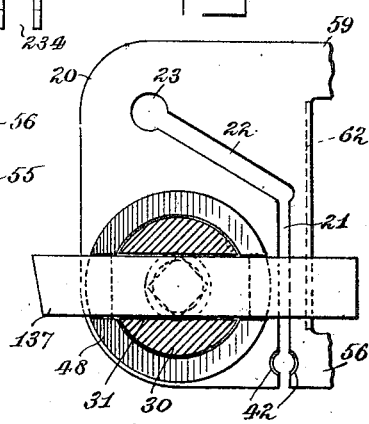
Figure 15:
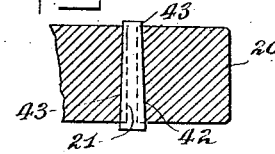
Figure 16:
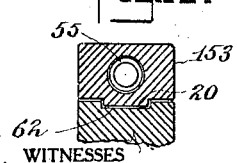
Figure 18:
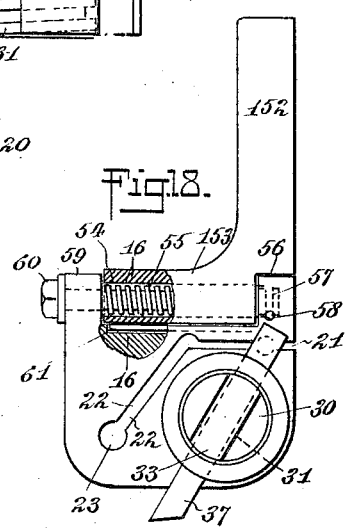
Figure 17:
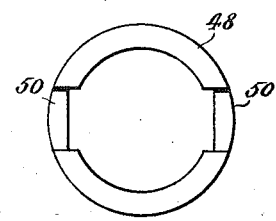

Figures 10$^a$, 10$^b$ and 10$^c$ are end views of the interchangeable adjusting elements employed, these views being given to show the variations in the slots of said elements for accommodating tools of varying sizes;

Figure 11 is an elevation of the tool holder with the stud reversed and showing the adaptation of the tool holder for holding a tool for cutting off stock;

Figure 12 is an elevation of the tool holder without the stud, sleeve, or stud-securing screw, the view being given to show the inner clutch element appurtenant to the holder;

Figure 13 is a view partly in plan and partly in horizontal section, the section line being indicated by the line 13—13, Figure 11;

Figure 14 is a vertical section in a plane indicated by the line 14—14, Figure 13;

Figure 15 is a fragmentary detail in horizontal section through the holder as indicated by the line 15—15, Figure 12, a tapered pin for preventing resiliency in the holder being shown in plan;

Figure 16 is a detail in cross section through the holder assemblage shown in Figure 18, the plane of the section being indicated by the line 16—16 in said Figure 18;

Figure 17 is a face view of one of the collars employed on the stud and utilized for securing in the holder a thin tool for cutting off stock;

Figure 18 is an elevation with parts in section showing on the holders a non-adjustable shank for use in planers;

Figure 19 is a side elevation showing a modified form of the head and shank;

Figure 20 is a sectional plan view on line 20—20 of Figure 19.

In carrying out my invention in accordance with the illustrated example, I provide the tool-holding head 20 and formed therein is a slot designated generally by the numeral 21 which extends from what is the lower end of the head 20 when the tool holder is employed in the lathe. Said slot has an oblique portion 22 terminating in an enlarged hole 23 after the manner of a keyhole. The slot 21 extends through the mentioned lower end of the head 20 at one side of a vertical line passing through the axis of the tool-holding means provided in the head 20 as hereinafter described. Said slot 21 extends vertically from its lower end and then is deflected laterally in the form of an elongated oblique portion 22 extending beyond the mentioned vertical line passing through the axis of the tool-holding means. The arrangement of the slot referred to serves to provide the maximum resiliency in that portion of the head 20 holding the tools and gives to said tool-holding portion a resiliency akin to that of a torsion spring since the flexure will be approximately about a point adjacent to the terminal 23 of the slot.

The head 20 at the resilient portion thereof, that is to say, at a side of the slot 21, 22 has a transverse hole 24 which has a threaded portion 25 of reduced diameter at the back of the head 20 which threaded portion receives a threaded bushing 26 on a clutch element 27. The clutch element 27 has teeth 28 and mating teeth 29 are provided on one end of a tool bit receiving stud 30. On the exterior of stud 30 at the end opposite the teeth 29 are threads 31. Also, at the threaded end the stud 30 is formed with a transverse slot 32 which receives an adjusting element 33, said adjusting element being formed with a transverse slot 34 as well as with wings or extensions 35 (Figures 5 to 10) presenting shoulders 36. A tool bit 37 is accommodated in a slot 34 of adjusting element 33 and said element is interchangeable.

In Figures 10$^a$, 10$^b$ and 10$^c$ are shown elements 33, 133 and 233 having slots 34, 134 and 234 of different sizes to accommodate bits 37 of varying sizes.

A sleeve 38 has internal threads 41 to engage the threads 31 and is formed with clutch-like members 39 separated by slots 40 of varying widths to accommodate tool bits of different sizes.

In order to render the resilient head 20 solid or non-resilient, a tapered pin 43 (Figures 12 and 15) may be employed fitting opposed recesses 42 in the side walls of the slot 21. A tightening screw 44 is provided at the back of the head 30 for passing through the threaded bushing 26 to engage in an internally threaded bore 130 of the stud 30. Said screw 44 has a squared end 45 for receiving a wrench and if turned forwardly causes the studs 30 to engage the clutch teeth 29 with the fixed clutch teeth 28. A flange 46 at the base of head 45 bears against a washer 47 which is disposed against the back of the head 20.

For holding a wide thin tool 137 for use in cutting off stock, two collars or washers 48, 49 are employed, such washers being alike and shown best in Figures 3, 13 and 17. Each washer has a lining slots 50, the bottom walls 51 of which constitute inclined seats for the thin tool or blade 137, the inclination of the seats 51 (see Figure 3) serving to dispose the tool bit for proper clearance.

With the described construction the stud being disengaged from the clutch 27 by turning back the screw 44, said stud is removed from the holder. The proper bit 37 having been selected an adjusting element 33, 133, 233 is selected corresponding with the size of the bit and said element is placed in the slot 32 of stud 30. The sleeve 38 which constitutes in effect a knurled nut is turned upon the stud 30 until the particular slot 40 in said sleeve registers with the slot in the adjusting element 33. The tool bit 37 is now inserted through the sleeve 38 and passed through the adjusting element 33 and thus through the stud, thereby being positioned passing through the sleeve, stud and adjusting element for projecting it the desired extent beyond the periphery of the sleeve 38.

The stud 30 and sleeve 38 carrying the tool bit are now inserted in the holder 20 and turned until the proper angle of the tool 37 is obtained after which the back tightening screw 44 is inserted and by the turning of said screw all the parts will be securely locked in the resilient part of the holder. It will be seen that the three slots 40 provide three predetermined angular positions for the tool bit 37 and it will be seen that the angle or rake will thus be constant and not be dependent on the skill or knowledge of the operator of the machine. Furthermore, the grinding is limited to the end of the tool bit with my arrangement and there is thus no waste of tool metal as in other forms of tool holders where the rake is required to be obtained by grinding which often results in the weakening of the tool where the strength is most needed. Where a thin blade 137 is employed in the tool holder for the purpose of cutting off stock, the two washers or collars 48, 49 are employed with the slotted bases thereof opposed as shown best in Figure 13.

In Figures 1 to 4 where the tool bit 37 is employed only one collar 48 is used and this is bound firmly against the face of the head 20 by engagement of the tool bit 37 under the pressure of the sleeve or nut 38.

In lathe work a shank 52 is provided for the tool-holding head 20. Said shank has a head 53 formed with a threaded bore 54 to receive a screw 55 which is swivelled at one end in a lug 56 at the bottom of head 20, the swivelling in the example shown being produced by an annular groove 57 in screw 55 and a changeable pin 58 engaging in said groove and passing through the lug 56. At the top the screw 55 has a reduced diameter passing freely through an upper lug 59. The squared head 60 on the screw is adapted to receive a wrench. The shank 52 is fitted in the lathe tool post A in the usual manner. By turning the screw 55 the head 20 and screw 55 will be caused to travel relatively to the head 53 of shank 52, the amplitude of movement being limited to lugs 56 and 59. Thus, the head 20 with its bit 37 may be adjusted vertically relatively to the piece of work B so that the bit engages the work B in the most effective manner. The adjustment of the head 20 by the screw 60, it will be seen, in no way, affects the predetermined angle of approach or rake of the bit 37 and yet properly disposes the bit in relation to the work for effective action.

In Figure 18 a shank designated 152 for use in planers, is shown disposed vertically and as having a head 153 completely filling the space between the lugs 56, 59. Thus, the same screw 55 serves to fasten the head 20 rigidly to the shank 152 for planer work. After the screw is positioned locking the head 153 in position, the pin 58 may be inserted to prevent the separation of the parts.

The vertical portion of the slot (21), it will be seen, is at that side of the head adjacent to the shank 52, while the slot 22 extends transversely of the head past the vertical medial line of the head. The result is that the portion of the head remote from shank 52 yields, the line of yielding being at the slot portion 21 which is approximate to a vertical line touching a point of the bit 37, whereby the spring is sensitively responsive to the impulse of the feed mechanism and the tool may recede with a quickness to prevent chatter. The provision of positive positions for the tool bits and representing the most approved rake angles makes it unnecessary to grind the tool bits except at the end. The holder, it will be seen, has provision for holding tool points or bits of varying sizes from the thin ones required in cutting off material to the wide or thick ones required for large forming tools.

By the described adjustment of the head relatively to the shank by the screw 55, not only may another position of the tool point be procured without altering the rake angle but also the screw provides that the diameter or depth of cut may be determined accurately within one-ten-thousandth part of an inch while the lathe is running since the adjustment by the screw moves the tool point vertically relatively to a horizontal line drawn diametrically through the work. In the final revolutions of the work the sensitiveness of the spring action enables the operator to cause the tool to remove a very delicate chip, thereby producing a mirror finish on the work surface thus making filing or polishing unnecessary as has been demonstrated in practice.

In further explanation of the adjustment of the tool at predetermined angles, I again refer to the clutch teeth 28, 29, which, it will be observed, are twenty-four in number and that the teeth in each series aline diametrically. The result is that in engaging the clutches a shift of one tooth varies the angle of the tool 15°. Hence, one adjustment of a tooth may be obtained directly horizontal, or with a shift of one tooth of the clutches the tool will be disposed 15° to the horizontal, or a shift of two teeth will dispose the tool 30° to the horizontal, these three positions being the most desirable angles for effective work and a predetermined rake may be assured at all times such as will be suitable and effective for a given piece of work. Ordinarily, the rake is obtained by experiment and trial and through the medium of grinding the tool all of which is done away with in my invention.

With the described resilient head furthermore, wide forming tools may be used without breakage and without chattering or shocks owing to the strength of the spring, notwithstanding its sensitiveness. The digging in of the tool is effectively prevented, the digging in being a common incident to the use of large or wide tools unless the lathe or planer is of exceptional rigidity or the speed is very much reduced. The employment of my assemblage makes it possible to run the lathe or planer at a high speed, thereby saving time and labor costs. The pin 43 enables the tool holder to be quickly changed from a spring holder to a rigid one.

In Figures 19 and 20 is another form of the spring head designated generally 120. Said head is formed with a slot 121 which extends from the bottom edge of the head similarly to the slot 21 and nearer the shank 252 than to the opposite side of the head. The slot 121 instead of being deflected at an angle at its upper portion extends on oblique lines to a point adjacent the opposite side and terminates in a hole 223 complementary thereto. The head at that side of the slot opposite the shank is enlarged as at 66 to afford ample material for the forming of the transverse hole 124 and its reduced end 125 corresponding with the hole 24 and its end 25 and still preserve its strength. The enlargement at 66 extends below the lower edge portion at the opposite side of the slot 121 and thus enables the hole 124 to be brought lower so that the resilient arm has a greater length and therefore greater resiliency.

In the form shown in Figures 19 and 20 the shank 252 has a head 253 which fits snugly in the space between the lower lug 256 and upper lug 259 on the head 120. I have shown the shank head 253 with a threaded bore 254 corresponding with the threaded bore 54, so that said shank may be made interchangeable with the shank 52 in head 20. To retain the shank 252 in position on the head 120, side clamp plates 60 are employed having bosses 61 on their inner faces entering recesses 62 in the head 120. A bolt 63 extends through bolt holes extending through the clamp plates 60 and through bosses 61, the bolt hole 64 of one clamp plate 60 being threaded to engage the threads of the bolt 63. On the clamp plates 60 are formed inwardly directed lugs 67 to engage the head 253, said lugs and the opposed surfaces of the head 253 being bevelled as at 68.

I would mention that my improved tool holder is especially adapted to receive known forming tools which are made of disks of steel and in universal use in screw machines, lathes and planes. With my tool-holding means the stud 30 may be revolved until the tool is worn out as a given adjustment of the clutch merely changes the cutting point 15°. As the forming tools referred to are commonly held in the horizontal position they may be adjusted by means of the screw 55 to aline with the center line of the lathe.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. A tool holder including a head, a turnable stud adapted to receive a tool transversely and turnable on the head for varying the rake of the tool, and an adjusting element accommodated in said stud, said element having sides rigid with each other and presenting a slot defined by said rigid sides through which slot a tool held by said stud may be passed, said adjusting element being removably held in the stud whereby to be replaced by a similar element accommodating a tool of a different size.

2. In a tool holder, a head, a stud turnably mounted on said head and adapted to accommodate a transversely disposed tool, a sleeve threaded on the stud, the said sleeve having one end plane and formed at the other end with transverse tool seats disposed in various angular positions, said sleeve being removable from the stud and adapted to be reversed for disposing toward the head either end of the sleeve.

3. In a tool holder, a head, a stud turnably held to the head and having a transverse slot through which a tool may be passed, an adjusting element accommodated in the slot of the stud and itself having a slot to register with the slot of the stud, said slot defined by rigid walls, said adjusting element at the sides of the slot having end extensions presenting shoulders, and a sleeve threaded onto the stud and engageable with said shoulders.

HJALMAR NATANAEL ORUP.